United States Patent
Lubbers et al.

(10) Patent No.: US 7,831,624 B2
(45) Date of Patent: Nov. 9, 2010

(54) SKIP LIST WITH ADDRESS RELATED TABLE STRUCTURE

(75) Inventors: Clark Edward Lubbers, Colorado Springs, CO (US); Robert Michael Lester, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 1101 days.

(21) Appl. No.: 11/166,901

(22) Filed: Jun. 24, 2005

(65) Prior Publication Data

US 2006/0294118 A1    Dec. 28, 2006

(51) Int. Cl.
*G06F 7/00* (2006.01)
(52) U.S. Cl. .................................... 707/796
(58) Field of Classification Search .......... 707/999.102, 707/99.003, 796
See application file for complete search history.

(56) References Cited

U.S. PATENT DOCUMENTS

| | | | |
|---|---|---|---|
| 5,761,501 A * | 6/1998 | Lubbers et al. ............ 707/100 |
| 6,088,701 A | 7/2000 | Whaley et al. |
| 6,117,185 A | 9/2000 | Schmidt |
| 6,216,199 B1 | 4/2001 | DeKoning et al. |
| 6,243,783 B1 | 6/2001 | Smyers et al. |
| 6,246,682 B1 * | 6/2001 | Roy et al. ................... 370/390 |
| 6,567,896 B1 | 5/2003 | James |
| 6,654,760 B2 | 11/2003 | Baskins et al. |
| 6,671,694 B2 | 12/2003 | Baskins et al. |
| 2002/0087500 A1 * | 7/2002 | Berkowitz et al. ............. 707/1 |
| 2004/0054807 A1 * | 3/2004 | Harvey et al. ............... 709/243 |
| 2004/0107346 A1 * | 6/2004 | Goodrich et al. ............ 713/176 |

OTHER PUBLICATIONS

William Pugh, "Skip Lists: A Probabilistic Alernative To Balanced Trees," Communications of the ACM, 33 ed., No. 6, p. 668-676, (Jun. 23, 1990).

* cited by examiner

*Primary Examiner*—Charles Rones
*Assistant Examiner*—Dinku W Gebresenbet
(74) *Attorney, Agent, or Firm*—Fellers, Snider, et al.

(57) ABSTRACT

Apparatus and method for efficiently arranging and searching data in a memory space, such as a cache memory of a data storage array controller. A data structure comprises a skip list of nodes having an array of forward pointers. Each node has a node level derived from an index at which the node is stored in a table in the memory space. The total available number of nodes is preferably selected to be less than half of the largest power of 2 that can be expressed by a number of bits of the index, and the nodes are preferably stored at only even or only odd indices of the table. In such case, a free list of nodes is preferably generated from an array of pairs of counts and indices to identify the available nodes. Additional table structures can further be provided to enhance data arrangement and searching functions.

19 Claims, 4 Drawing Sheets

SKIP LIST WITH ADDRESS RELATED TABLE STRUCTURE

FIELD OF THE INVENTION

The claimed invention relates generally to the field of data structures and more particularly, but not by way of limitation, to an apparatus and method for providing a skip list of nodes with an address related table structure in a digital computer memory environment.

BACKGROUND

A skip list is a useful type of data structure for arranging data in a memory space, such as a cache memory of an array controller in a data storage system. A skip list is a form of a linked list where each item, or node, in the list has a random number of extra forward pointers. Searching such a list approximates the performance of searching binary trees, while having dramatically lower cost in terms of maintenance as compared to a binary tree.

Generally, a skip list is maintained in an order based on comparisons of a key field within each node. The comparison is arbitrarily selected and may be ascending or descending, numeric or alpha-numeric, and so forth. When a new node is to be inserted into the list, a mechanism is generally used to assign the number of forward pointers to the node in a substantially random fashion. The number of extra forward pointers associated with each node is referred to as the node level.

While skip lists have been found operable in a number of data structure management applications, there nevertheless remains a continued need for improvements in the art that promote enhanced memory utilization and searching efficiencies. It is to these and other improvements that the claimed invention is generally directed.

SUMMARY OF THE INVENTION

Preferred embodiments of the present invention are generally directed to an apparatus and method for efficiently arranging and searching data in a memory space, such as a cache memory of a data storage array controller.

In some implementations, a data structure is resident in a memory space comprising a skip list of nodes having an array of forward pointers. Each node in the skip list has a node level in relation to a number of forward pointers from the array associated with said node. Each node level is derived from an index at which the node is stored in a table in the memory space.

Preferably, the nodes are arranged by node level in the table so that nodes at the highest node level are grouped together at a lowest set of available indices of the table. The node level for each node is preferably determined in relation to a number of leading zeroes in the associated index. The total available number of nodes of the skip list is further preferably selected to be less than half of the largest power of 2 that can be expressed by a number of bits of the index (e.g., using $2^{14}$ nodes with a 16 bit index; using $2^{30}$ nodes with a 32 bit index, etc.).

Preferably, nodes at relatively lower node levels comprise an m-bit format (such as 8 bytes), nodes at relatively higher node levels comprise an n-bit format (such as 16 bytes), and m is less than n.

The available indices of the table preferably comprise sequentially even and odd indices, and the nodes are stored at only a selected one of said even indices or odd indices. In such case, a free list of nodes is preferably generated from the table from an array of pairs of counts and indices.

Further, the table can be preferably characterized as a first primary table, and the data structure is further preferably provided with a second primary table to store additional nodes when a distribution of nodes at relatively higher node levels in the first primary table is reduced. A secondary table can also be provided to store a second type of information associated with the first type of information stored by the primary nodes. The structure further preferably comprises up and down queues to facilitate an elevator search of the nodes.

In further implementations, the method preferably comprises generating a skip list of nodes having an array of forward pointers, with each node in the skip list comprising a node level in relation to a number of forward pointers from the array associated with said node. The nodes are indexed in a table in a memory space by node level so that nodes at the highest node level are grouped together at a lowest set of available indices of the table.

Preferably, the indexing step comprises deriving the node level for each node in relation to a number of leading zeroes in an index value associated with the address of said node in the table. The index value preferably comprises a power of two (e.g., such as 16 bits, 32 bits, etc.).

As before, the total number of nodes of the skip list of the generating step is preferably selected to be less than half of the largest power of 2 that can be expressed by a number of bits of an index field used to address the table of the indexing step (such as by using $2^{14}$ nodes with a 16 bit index; using $2^{30}$ nodes with a 32 bit index, etc.).

The generating step further preferably comprises providing nodes at relatively lower node levels with an m-bit format and providing nodes at relatively higher node levels with an n-bit format, wherein m is less than n. The available indices of the table preferably comprise sequentially even and odd indices, and the nodes are preferably stored during the indexing step at only a selected one of said even indices or odd indices using a free node generation routine.

These and various other features and advantages which characterize the claimed invention will become apparent upon reading the following detailed description and upon reviewing the associated drawings.

DETAILED DESCRIPTION

Figure 1:
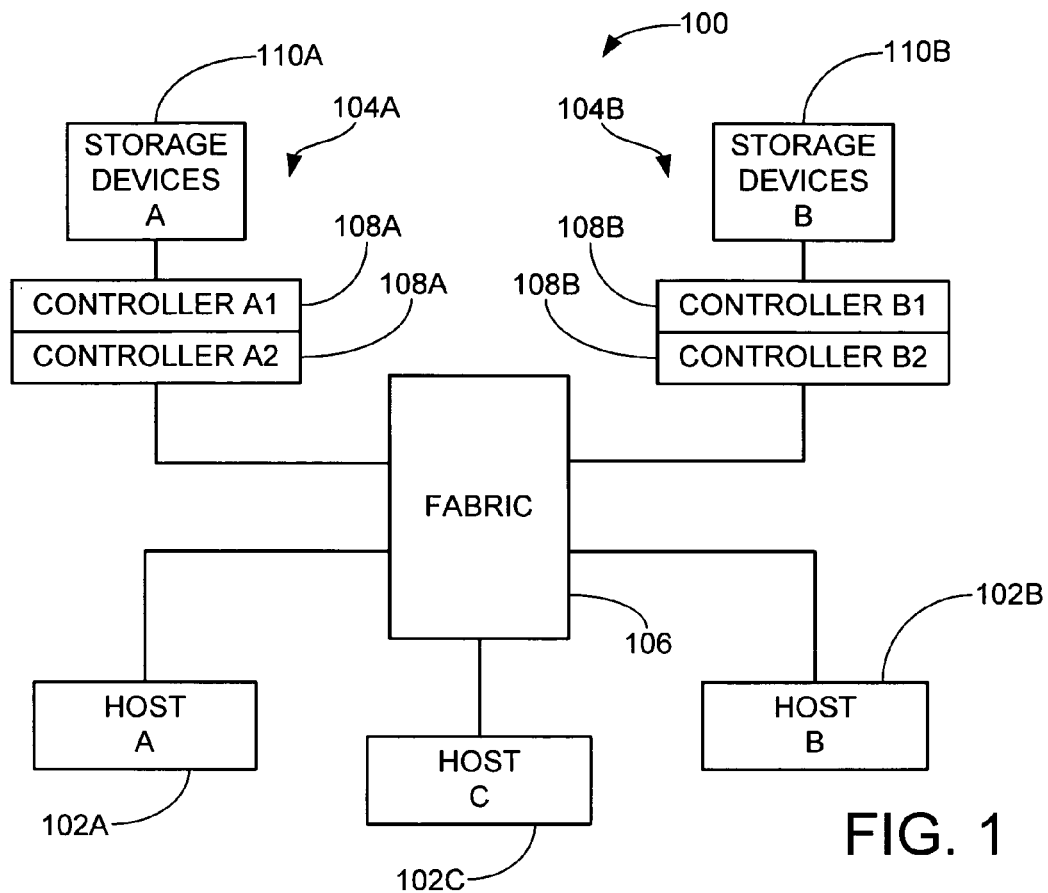
FIG. 1 is a functional block representation of a computer-based system characterized as a wide-area network utilizing mass storage.

To provide an exemplary environment in which preferred embodiments of the present invention can be advantageously practiced, FIG. 1 shows a computer based system 100 characterized as a wide area network (WAN) utilizing mass storage.

The system 100 includes a number of host computers 102, respectively identified as hosts A, B, and C. The host computers 102 interact with each other as well as with a pair of (A and B) data storage arrays 104 via a fabric 106. The fabric 106 is preferably characterized as a Fibre Channel based switching network, although other configurations can be utilized as well including the Internet.

Each array 104 includes a pair of controllers 108 (denoted A1, A2 and B1, B2) and a set of data storage devices 110 preferably characterized as disc drives operated as a RAID. The controllers 108 and data storage devices 110 preferably utilize a fault tolerant arrangement so that the various controllers 108 utilize parallel, redundant links and at least some of the user data stored by the system 100 are stored in a redundant format within at least one set of the data storage devices 110. The host computers 102 can be physically located adjacent to, or remote from, the respective arrays 104.

Figure 2:
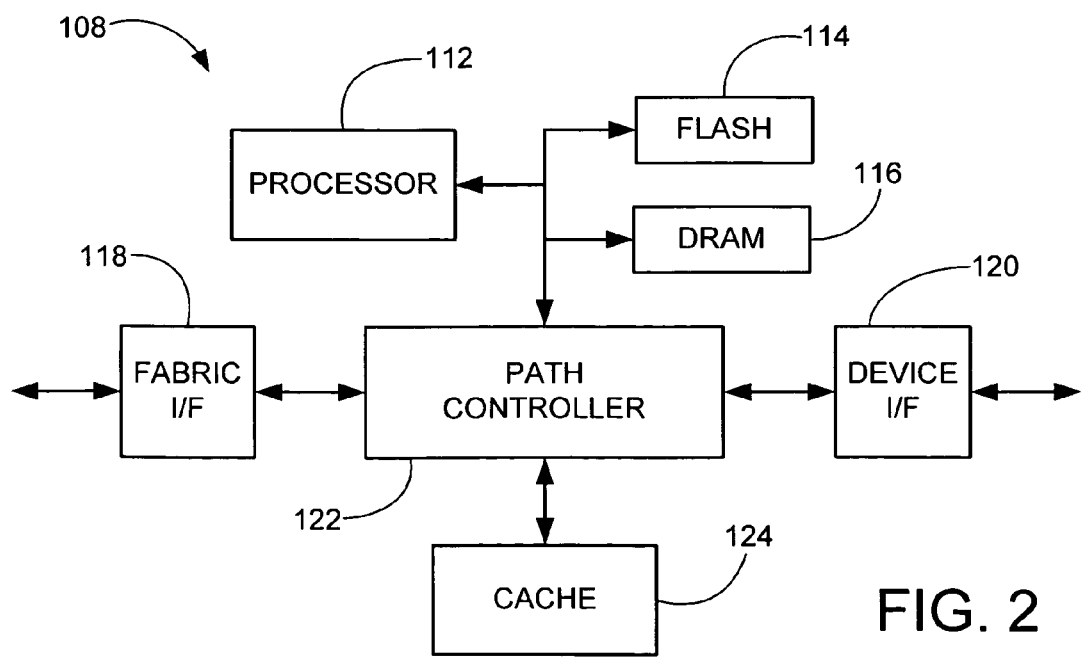
FIG. 2 provides a functional block representation of a selected one of the array controllers of FIG. 1.

FIG. 2 generally illustrates a selected one of the controllers 108 in greater detail. The controller 108 can be embodied in a single integrated circuit, or distributed among a number of discrete circuits as desired.

A processor block 112, preferably characterized as comprising one or more programmable computer processing units (CPUs), provides control in accordance with programming steps and processing data preferably stored in non-volatile memory 114 (such as flash memory or similar) and in dynamic random access memory (DRAM) 116. The processor block 112 preferably carries out intelligent storage and cache management functions as explained below.

A fabric interface (I/F) circuit 118 facilitates communication with the other controllers 108 and the host computers 102 via the fabric 106, and a device I/F circuit 120 facilitates communication with the storage devices 110. The I/F circuits 118, 120 and a path controller 122 form a communication path to pass commands and data between the storage array 104 and the host 102, such as by employing a cache memory 124.

During operation, the cache memory 124 will store user data and other information associated with I/O transfers between the hosts 102 and the storage devices 110. Readback data retrieved from the devices 110, including speculative data, may be retained for a time in the cache memory 124 in hopes of a subsequent "cache hit," so that the subsequently requested data are forwarded directly from the cache instead of requiring the scheduling of an access operation with the devices 110.

Similarly, a write-back cache policy can be employed so that data to be written to the devices 110 is cached, a write complete command is sent back to the initiating host 102, and the actual writing of the data to the appropriate devices 110 is scheduled at a later time.

It is thus generally desirable for the processor block 112 to maintain accurate control of the contents of the cache, including tracking the status of each entry. Such control is preferably carried out by way of a skip list arrangement which utilizes an address related table structure in accordance with preferred embodiments of the present invention. The skip list is preferably maintained in a portion of the cache memory 124, although other memory spaces can be utilized as desired.

Figure 3:
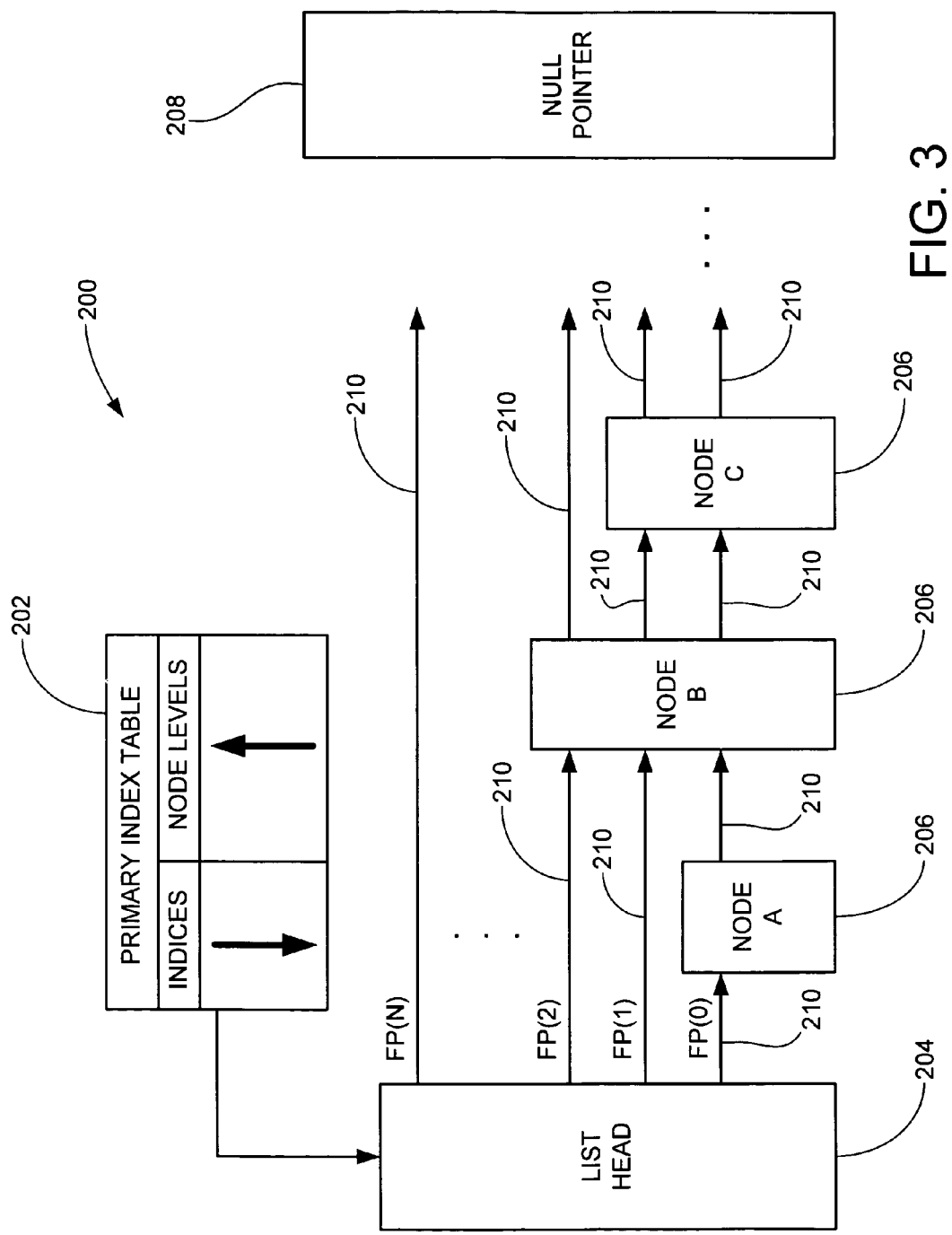
FIG. 3 generally illustrates a skip list with an address related table structure in accordance with preferred embodiments of the present invention.

A generalized architecture for the skip list is set forth at 200 in FIG. 3, and is shown to include an index table 202, a list head 204, a population of nodes 206 (the first three of which are denoted generally as A, B, C), and a null pointer block 208. Forward pointers (FP) from 0 to N are generally represented by lines 210.

Each node 206 is preferably associated with a quantum of data and/or information (such as metadata) in the cache memory 124. Each node 206 has an individual key such as a logical block address (LBA) value. The number of forward pointers 210 associated with each node 206 is assigned in a substantially random fashion upon insertion into the list 200. The number of extra forward pointers for each node is referred to as the node level for that node.

Preferably, the number of forward pointers 210 is selected in relation to the size of the list. Table 1 shows a representative distribution of nodes at each of a number of various node levels where 1 of N nodes have a level greater than or equal to x.

TABLE 1

| Level | 1 Out Of "N" | LZ |
|---|---|---|
| 1 | 4 | 2 |
| 2 | 16 | 4 |
| 3 | 64 | 6 |
| 4 | 256 | 8 |
| 5 | 1024 | 10 |
| 6 | 4,096 | 12 |
| 7 | 16,384 | 14 |
| 8 | 65,536 | 16 |
| 9 | 262,144 | 18 |
| 10 | 1,048,576 | 20 |
| 11 | 4,194,304 | 22 |
| 12 | 16,777,216 | 24 |
| 13 | 67,108,864 | 26 |
| 14 | 268,435,456 | 28 |
| 15 | 1,073,741,824 | 30 |

The values in the LZ (leading zeroes) column generally correspond to the number of index value bits that can address each of the nodes at the associated level (e.g., 2 bits can address the 4 nodes in Level 1, 4 bits can address the 16 nodes in Level 2, and so on).

It can be seen that Table 1 provides a maximum pool of 1,073,741,824 (0x40000000 nodes using a 30-bit index. This size pool is sufficient, for example, to cover all issued "Social Security Numbers" (SSNs) in the United States.

In accordance with preferred embodiments, a node address for each node is preferably derived from the index value. The associated node level is also preferably derived from the index value, where the number of leading zeros in the index is used to determine the level. This will be discussed in greater detail below.

From Table 1 it can be seen that, generally, 1 out of 4 nodes will have a level greater than "0"; that is, 25% of the total population of nodes will have one or more extra forward pointers. Conversely, 3 out of 4 nodes (75%) will generally have a level of "0" (no extra forward pointers). Similarly, 3 out of 16 nodes will generally have a level of "1", 3 out 64 nodes will have a level of "2", and so on.

If the list is very large and the maximum number of pointers is bounded, searching the list will generally require an average of about n/2 comparisons at the maximum level, where n is the number of nodes at that level. For example, if the number of nodes is limited to 16,384 and the maximum level is 5, then on average there will be 16 nodes at level 5 (1 out of 1024). Every search will thus generally require, on average, 8 comparisons before dropping to comparisons at level 4, with an average of 2 comparisons at levels 4 through 0.

Searching the skip list 200 generally involves using the list head 204, which identifies the forward pointers 210 up to the maximum level supported. A special value can be used as the null pointer 208, which is interpreted as pointing beyond the end of the list. Deriving the level from index means that a null pointer value of "0" will cause the list to be slightly imbalanced. This is because an index of "0" would otherwise reference a particular node at the maximum level.

However, it is contemplated that the total number of nodes will be preferably selected to be less than half of the largest power of 2 that can be expressed by the number of bits in the index field. This advantageously allows the null pointer to be expressed by any value with the highest bit set. For example, using 16 bits to store the index and a maximum of 32,768 nodes (index range is 0x0000–0x7FFF), then any value between 0x8000 and 0xFFFF can be used as the null pointer.

An advantage of deriving the node level from the node address is the ability to utilize the available memory efficiently, by preferably grouping together and densely packing each of the nodes of a given node level in different sections of the memory. As represented in FIG. 3, the index table 202 generally arranges the nodes so that the maximum level nodes have the lowest indices in the table, followed by the next level down, and so forth.

On a CPU with data caching based on cache lines (e.g., block 112), the higher level nodes will generally tend to stay in the cache. Furthermore, searching will typically only trigger memory references at the lower levels.

Consider an example scenario where the number of nodes is 16,384, and every "primary" node occupies 16 bytes made up of 4 bytes of key information and 6 2-byte Forward Pointer Indices (FPI). From Table 1, generally only 1024 nodes (1 out of 16) will have a level greater than "1". These nodes are preferably placed within a dense area of 16 KB in the table 202. In a system with 32 KB of data cache, searching down to level "1" would require no memory references if half the cache was used to hold the nodes with levels greater than "1". After that, two references would occur at level "1" and two at level "0". Of course, this is an ideal case, but from this it will be recognized that higher levels will generally tend to stay in the cache due to frequency of reference.

It is desirable to minimize the average number of memory references by optimizing the table structure for searching where data caching is used. Note, however, that the architecture of FIG. 3 can also be used for searching media (e.g., the storage devices 110, FIG. 1) where the caching is explicitly implemented as part of the operation. That is, data read from the media can be cached, and the data on the media can be structured to store keys and pointers densely with the bulk of the node (or "record") data being stored in a "secondary" table. Examples of each of these implementations will be given below.

Seek Queue Example

A first exemplary implementation of the skip list architecture presented herein will now be discussed with respect to seek queue management for the controller 108 of FIG. 2.

In this illustrative example, it is contemplated that the maximum number of host requests across the entire set of seek queues (nodes) is 16,384 ($2^{14}$). It is desirable that adding and removing nodes be efficient in terms of memory references because the operation is in the critical path to servicing the respective host requests. It is also contemplated that at times, some queues may be almost empty while others may have thousands of requests queued. It is also desirable to minimize memory consumed for searching as well as for storage of the skip list.

Accordingly, each primary node is configured to at least comprise the key value used for searching, as well as an identification of the forward pointers associated with the node. An exemplary minimal primary node format is presented in Table 2:

TABLE 2

| Field Name | Size (in Bytes) | Contents |
| --- | --- | --- |
| LBA | 4 | Search Key (Logical Block Address) |
| FPI [2] | 2*2 | Forward Pointer Indices [0-1] |

This format provides a node length of 8 bytes and can be used when the node level is "0" or "1". Note that it is a power of 2 in size. Another proposed node format for levels "0" to "5" is provided in Table 3:

TABLE 3

| Field Name | Size (in Bytes) | Contents |
| --- | --- | --- |
| LBA | 4 | Search Key (Logical Block Address) |
| FPI [6] | 6*2 | Forward Pointer Indices [0-5] |

This format provides a longer node length of 16 bytes. The searching operation will generally not need to consider which size node is involved because it will reference pointers based on the current level at which comparisons are taking place. The table of primary nodes 202 preferably comprises a block of memory aligned to its size (e.g., 128KB).

From Table 1, it could be generally expected that 1024 (1 out of 16) of the 16,384 nodes will be at level 2 or higher. Based on an address derived level, these nodes will accordingly be assigned indices in the range 0x0000 through 0x03FF in the table 202.

If all nodes are the same size (e.g., 16 bytes in accordance with the format of Table 3), the node address can be derived from the index by multiplying the index by the node size (shift left 4) and adding the base of the table or using an OR (if the table is aligned). However, a substantial amount of memory can be saved (e.g., 16,384*8*15/16=122,880 bytes) if the smaller node format of Table 2 is used when the level is "0" or "1". This may cut the amount of memory referenced roughly in half when considering the amalgam of searches over a period of time. As before, a shift left+addition operation can be used to derive the node level from the index on the nodes with the smaller format (e.g., Table 2).

In an alternative preferred approach, only even indices are used in the range of 0x0000 through 0x03FE in the table 202. The corresponding odd index for a given even index will map to a node of the same size just beyond the one with the given even index. This advantageously allows the address to be derived for nodes of both sizes using the same operation (in this case, shift index left 3 and add base), since the even index would actually produce the address of a 16-byte node. It will be recognized that, alternatively, only odd indices could be selected in lieu of even indices as desired.

A limitation with this approach, however, is that the number of nodes at the higher levels will generally only be half of what is desired; that is, generally, the average number of comparisons at each level above "1" would be 4 instead of 2.

This can be addressed by creating a "free list" of nodes. A preferred approach to generating the free list is generally set forth by a FREE LIST GENERATION routine 220 in FIG. 4. A level is randomly selected at step 222, and the next available index at the selected level is selected at step 224 from an array of pairs of counts and indices 226. The identified node is linked to the end of the free list at step 228, and the flow returns at step 230.

When the selected level is exhausted, step 232, the level is changed at step 234, such as by decrementing to the next lower level or by moving to the next highest level when that is unsuccessful (but more nodes are available). This continues until all index values have been consumed, step 236, after which the process ends (step 238).

Table 4 shows exemplary initial values for the pairs of counts and indices of the foregoing approach (step 226). It is contemplated that a total of 15,871 valid index values are available from the initial population of 16,384 by leaving out odd indices from 0x0000 through 0x03FF as well as the value 0x0000).

TABLE 4

| Node Level | First Index | Count |
|---|---|---|
| 0 | 3FFF | 12888 |
| 1 | 0FFF | 3072 |
| 2 | 03FE | 384 |
| 3 | 00FE | 96 |
| 4 | 003E | 24 |
| 5 | 000E | 7 |

Note that "picking" in the above context means checking the count at the generated level. If the count is non-zero, the index picked is extracted, the count is decremented, and the index is decremented by "1" if the level is "0" or "1" or by "2" if the level is greater than "1". The routine 220 of FIG. 4 can thus be characterized as a do-loop with a count of 15,871.

It follows that the routine 220 will generate exactly 15,871 indices based on the sum of the counts. When the count is "0", the current level is less than or equal to the generated level and if the current level is not "0", the level is decremented and the process is repeated. When the count is "0" and the current level is "0", the level is set to the generated level plus 1 and the process is repeated. When the count is "0" and the current level is greater than the generated level, the level is incremented and the process is repeated. In this way, if an index remains available, it will be located within the loop.

Using this approach, those skilled in the art will recognize that higher level nodes may be exhausted about halfway through the process. This is not necessarily a problem if allocations are made from the front of the list and deallocations are made to the front of the list. This will generally preserve the randomness of the level chosen, as well as produce the desired distribution until more than half of the nodes are in use.

It is contemplated that only in extremely rare circumstances will the other half of the nodes be required. Under these circumstances, performance will be degraded, but generally not beyond twice the normal heavy load performance of the system. Light loads on the other hand, will generally tend to have relatively small queues of seek requests. It is noted that the larger loading requirements may not necessarily comprise heavy benchmark loads. Rather, such larger loading requirements are contemplated to exist in situations where the system is saturated due to seeking (with an attendant amount of idle time due to seek delays).

When the distribution of nodes at each level is substantially "normal" (as predicted by probability distribution), this condition is referred to herein as being "equal weight". An "underweight" condition, on the other hand, will arise when the number of utilized higher level nodes is less than normal.

Figure 5:
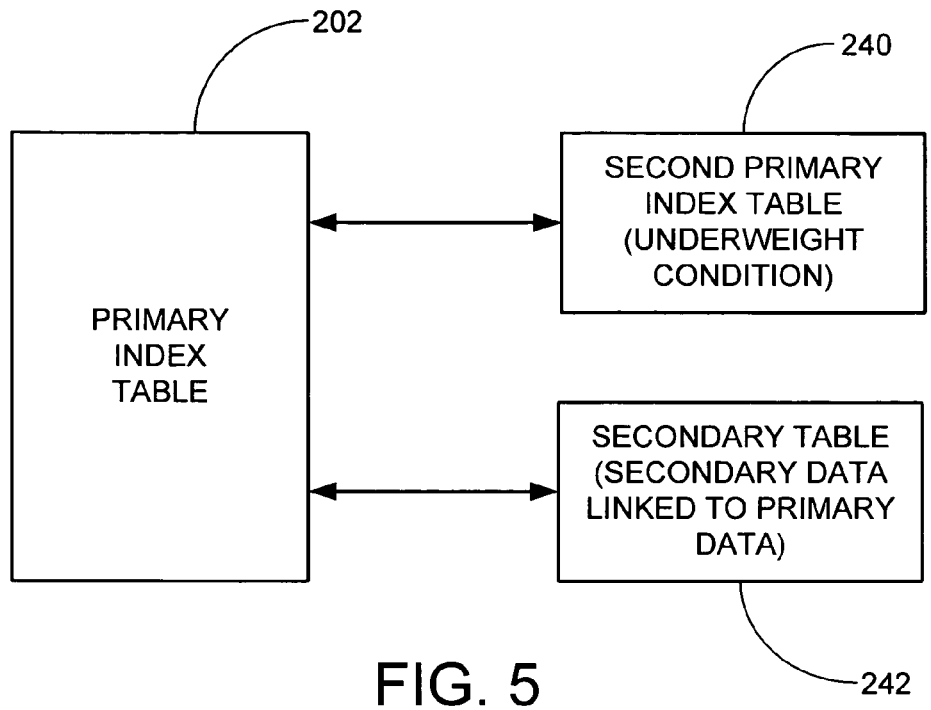
FIG. 5 provides an alternative table structure to that represented in FIG. 3.

An underweight condition can be compensated by allocating a second primary table (such as 8 KB, or 512*16) to hold nodes with odd indices in the range 0x0001 through 0x03FF, such as represented at 240 in FIG. 5. The calculation to compute the node address uses the second base address instead of the first when the level is greater than 2 and the index is odd.

The node level of each node is preferably derived from a pointer (treated as a 32-bit number) by counting leading zeros, subtracting 18, dividing by 2, and forcing level 6 to 5. Several commercially available processors, such as the PowerPC, have instructions (the GNU compiler makes the instruction available via a built-in function call) to count leading zeros in a value, which simplifies this operation. The removal of the node with index "0" from usage to serve as the "null pointer" is preferred because detecting a "0" value is typically more efficient than testing for a bit being set.

Continuing with the current seek queue example, it will be recognized that in many situations additional information apart from the key value (LBA) will be required, such as state information about the request as well as a pointer to a structure to be returned to the initiator (e.g., host 102). This information can be stored in an additional quantum of data (e.g., 4 bytes) arranged in a secondary table such as 242 in FIG. 5. The secondary table 242 can be referenced via the indices of the primary index table 202. If all entries in the secondary table 242 are uniform in size, the overall table size will also be a power of two (e.g., 64 KB in this case).

With reference again to FIG. 3, each seek queue will preferably have a list head 204 with a total of 6 forward pointers 210. Each list can be maintained in either ascending or descending order. The search operation is preferably selected based on the current ordering. The ordering can always be ascending when implementing a "saw-tooth" approach (sometimes referred to as "C-Scan").

When implementing an elevator approach for more efficiency, the ordering can be reversed when the last item on a queue is removed. Normally, the search operation will move through the list with items being inserted both before and after the current position in the list. However, a reversal mechanism, as proposed herein, preferably takes the remaining items from the list by locating the level 0 pointer and then zeroing the list head. The items are then inserted serially by moving through the linked list via level 0 pointers, inserting each item at the head 204.

This operation can be streamlined because it amounts to determining the node level of the node 206, copying the pointers 210 in the list head 204 at and below that level to the node 206, and setting the pointers in the list head at and below that level to the pointer to the given node.

Figure 6:
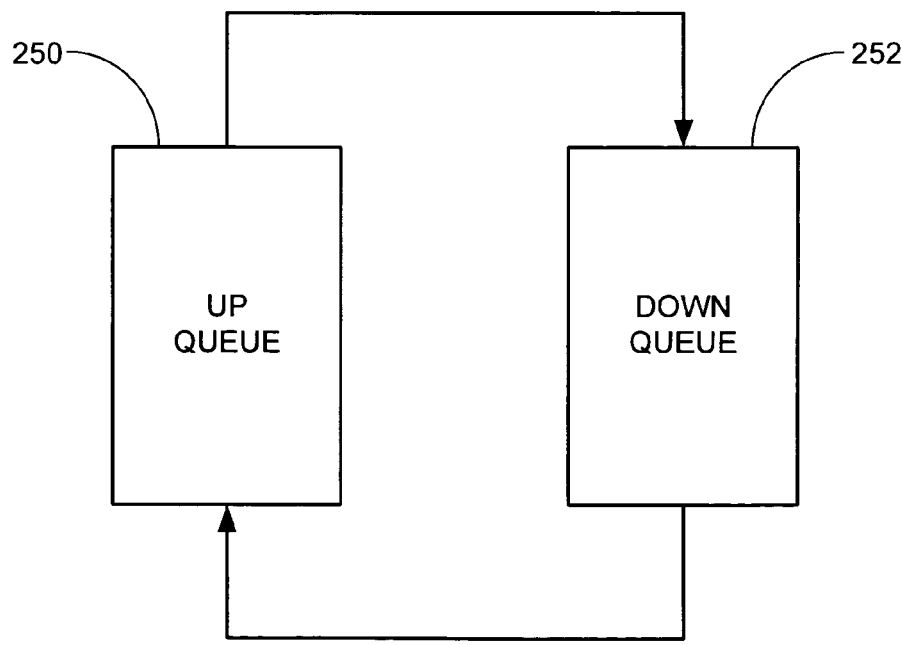
FIG. 6 represents a pair of up and down queues utilized during searching operations in accordance with preferred embodiments.

A preferred alternative to the reversal technique for an elevator search strategy is to use two queues, as represented in FIG. 6 at 250, 252. Up queue 250 holds all requests that are higher than the "current" location and is maintained in ascending LBA order. Down queue 252 holds all requests that are lower than the current location and is maintained in descending LBA order.

In this way, incrementing searches from the current location utilize the up queue 250, while decrementing searches from the current location utilize the down queue 252. The current location references the first item on whichever queue 250, 252 is in use. When an end point is reached in either queue, the search switches to the remaining queue, taking elements off serially.

Figure 4:
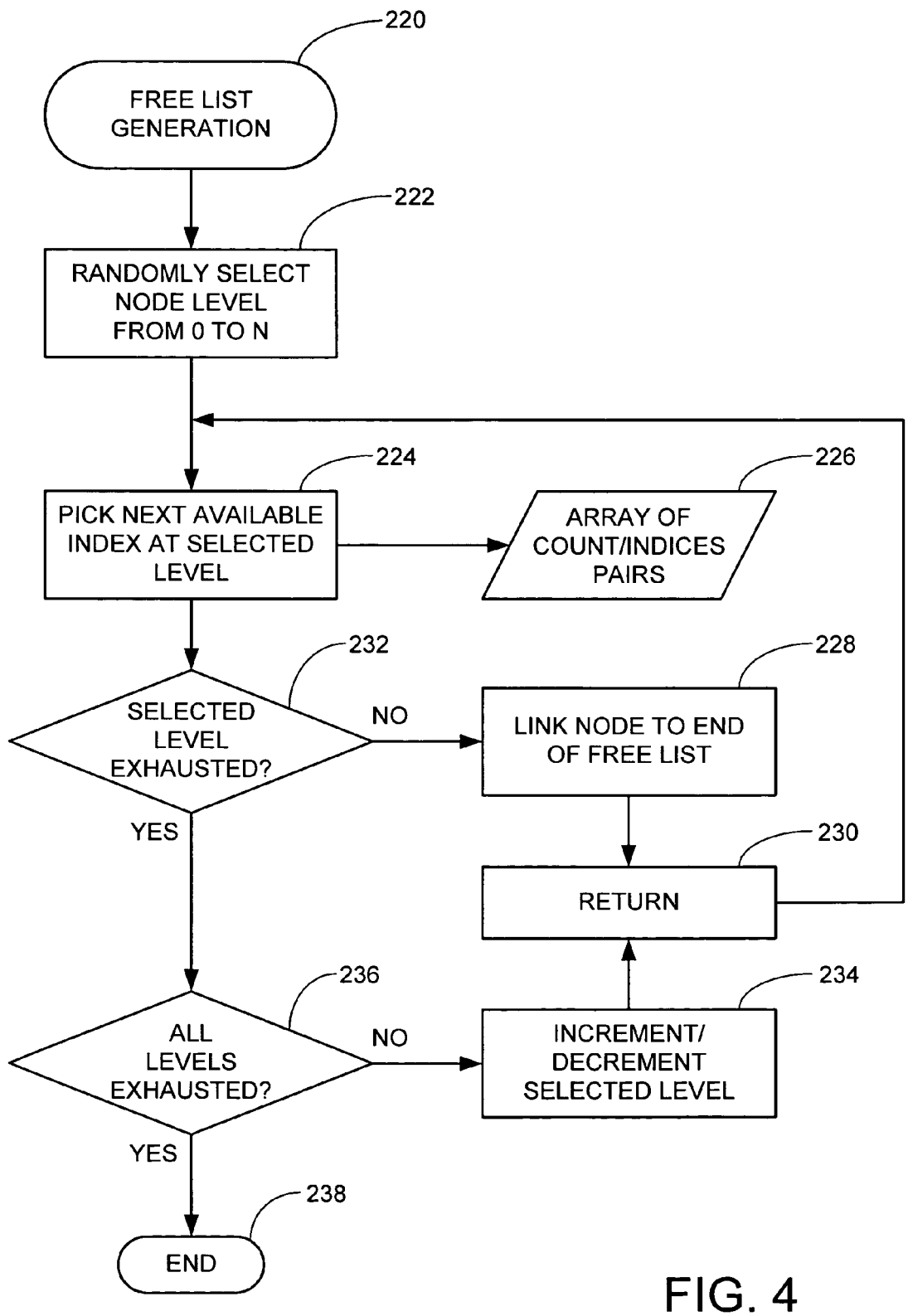
FIG. 4 provides a flow chart for a FREE LIST GENERATION routine, generally illustrative of steps carried out in accordance with preferred embodiments of the present invention.

In summary, the seek queue exemplary embodiments discussed herein preferably utilize a skip list 200 with an address related table structure (e.g., tables 202, 240). Node levels are address derived, and a free list derived level distribution, such as set forth by FIG. 4, are preferably obtained. A secondary table 242 is preferably utilized to link related (secondary) data associated with the primary nodes. Further, a seek methodology is preferably employed that uses an elevator approach with a reversal mechanism, or uses up and down queues 250, 252.

Media Skip List Example

A second exemplary implementation of the skip list with address related table structure will now be discussed with reference to a relatively large database maintained on the media (data storage devices 110). In this implementation, the skip list 200 is generally utilized to minimize searching overhead for various records within the database.

Issues relating to allocation and deallocation of records in such a database are largely omitted in the following discussion, except to note that the scheme described above (Example 1) can be readily tailored to directly allocate nodes using minimal metadata (i.e., just a table) for a database that does not require significant deallocation effort.

It will be recalled that Table 1 provided a maximum index that would support a population of over 1 billion nodes, sufficient, for example, to handle all Social Security Numbers (SSNs) issued by the United States Federal Government. In the current example, the database is extended to support up to about 4 billion SSNs, which can be facilitated with the use of 32 bit index values (i.e., $2^{32}$=4,294,967,296). Generally, it has been found easier to handle values that are powers of 2. The database stored in the devices 110 will thus be contemplated for the present discussion to constitute approximately $2^{30}$ 1,073,741,824) records.

Each record in this example on the media will be contemplated as comprising 2 kilobytes, KB. The entire database will thus require about 2 terabytes, TB of disc space among the devices 110.

As a benchmark to aid in the present discussion, an access method could utilize a prior art flat map architecture of 4 byte pointers for each record. This would generally require 4 gigabytes, GB of disc space on the devices 110, as well as two disc access I/O operations to locate and access the data for each record (one I/O would be to retrieve the data for the associated record itself).

However, it is desired to instead provide a cached skip list in accordance with FIGS. 3-6, so that a population of nodes is generated in local memory that corresponds to the respective records in the devices 110. Each node address provides access as before.

It will be noted at this point that special handling may be required if the index value is selected to be larger than the total number of allocatable nodes, as in the present example where a 32-bit index has been selected to support $2^{30}$ (1,073,741, 824) total possible records. An issue that arises is how to identify the "correct" number of leading zeroes in the index for node level determination.

In this example, an equal weight distribution will provide exactly four nodes with indices of 0, 1, 2 and 3 in the 15$^{th}$ level (level 14 using 0-14 levels). Table 5 shows the associated 32-bit representations of these index values:

TABLE 5

| Index (Base 10) | Index (Base 32) | No. of LZ? |
|---|---|---|
| 0 | 00000000000000000000000000000000 | 30, 31, 32 |
| 1 | 00000000000000000000000000000001 | 30, 31 |

TABLE 5-continued

| Index (Base 10) | Index (Base 32) | No. of LZ? |
|---|---|---|
| 2 | 00000000000000000000000000000010 | 30 |
| 3 | 00000000000000000000000000000011 | 30 |

From Table 5 it can be seen that the number of leading zeroes (LZ) generally depends on the convention employed to define LZ. It is clear that the 32-bit representations of index values 2 and 3 each have 30 leading zeroes. However, the 32-bit representation of index value 1 technically has 31 leading zeroes, and the 32-bit representation of index value 0 could have 31 or 32 leading zeroes, depending on whether the LSB (bit 0) is counted. If the two LSBs (bits 0-1) used for these entries are not counted, then alternatively all of the entries could be viewed as having only 30 leading zeroes.

Thus, to alleviate confusion, it will be understood that the number of leading zeroes is preferably determined by identifying the actual number of leading zeroes in the index value, not counting the LSB 0-bit value (if the "0" index value is used). For level 14, this will provide LZ values of 31 for indices 0 and 1, and LZ values of 30 for indices 2 and 3.

The node level is next preferably determined from this LZ value in accordance with the relation (LZ−2)/2, and rounding down as necessary for any fractions (integer division). For level 14, LZ values of 31 and 30 both result in the value of 14 ((31−2)/2=14.5→14 and (30−2)/2=14).

This is similarly applied to all of the remaining levels. For example, all level 0 nodes will have either 2 or 3 leading zeroes in the respective indices. Applying the above formulation ((2−2)/2=0 and (3−2)/2=1/2→0) results in ready identification of the associated node level of 0.

Continuing with the present example, a "basic" node will utilize a 32 bit key and 3 levels (0-2) of 32 bit pointers, for a total of 16 bytes. The primary basic nodes will occupy 31.5 million, M sectors (15.75 GB) on the media. These values can be derived from Table 1, seeing that 1 out of 64 nodes have a level greater than 2. With 1 billion (G) 16-byte nodes (K*M), exactly 32 M (16* K*M/512) sectors would be required; however, there are 16 M nodes above level 2 which are not basic nodes. Thus, the 32 M is reduced by 16 M*16/512, which equals 512K.

So-called "intermediate" nodes will be selected to be twice the size of the basic node (i.e., 32 bytes) and have 4 additional pointers. So-called "top" nodes will be twice the size of the intermediate nodes (i.e., 64 bytes) and handle 12 additional pointers for a total of 15 levels (0-14).

It will be noted that 1 out of 16,384 nodes (e.g., 65,536 or $2^{16}$ nodes) will be a top node of 64 bytes. The top nodes will occupy 4 MB (8K sectors). There will further be a total of 16,711,680($2^{24}$ minus $2^{16}$) intermediate nodes, which will occupy about 500 MB of sectors. Significantly, no node crosses a sector boundary in this scheme.

It is contemplated that there is only a little more than 128 MB of memory available to the processor block 112 to dedicate to high level nodes. Three-fourths of the intermediate nodes will generally be level 3. Thus, all level 4 through level 6 nodes can be fit into one-fourth of 512 MB (128 MB). All level 7 through level 14 nodes can be fit into 4 MB. It will be noted that generally, these respective groupings of nodes will be packed densely in the allotted memory (and the associated records will likewise be packed densely in the devices 110).

At this point, all nodes with levels 4 through 14 are cached in memory. As discussed previously, each search should require two additional references per level, given an equal weight distribution. The highest level nodes (e.g., levels 11-14) will fit into 16K and could, for example, be placed in processor data cache. Levels 9 and 10 can be placed in the L2 processor cache, assuming a 256K L2 cache is utilized.

For levels 4 through 8, an average of 16 memory references will generally be required. However, with a 1 GB data cache, all the level 3 nodes can be placed in non-volatile write-back (NV WB) cache. This will retain more than half the cache for accessing recently referenced "primary" nodes (for insertion purposes) and recently referenced secondary data.

Accordingly, in this implementation I/O disc transfers will only be required for levels 0 through 2, and the remaining levels can be searched locally. If each group of devices 110 represents an array of 40 disc drives capable of 250 IOPS per drive, then the system can locate and return the records for 1425 different individuals per second, using conventional and reasonably priced equipment. The system will also have sufficient processor time left over after the respective node searches to process the retrieved records and perform additional functions as well.

It will now be appreciated that preferred embodiments of the present invention are generally directed to an apparatus and method for efficiently arranging and searching data in a memory space, such as a cache memory (such as 124) of a data storage array controller (such as 108).

In some implementations, a data structure (such as 200) is resident in a memory space (such as 114, 116, 124) comprising a skip list of nodes (such as 206) having an array of forward pointers (such as 210), wherein each node in the skip list has a node level in relation to a number of forward pointers from the array associated with said node, and wherein each node level is derived from an index at which the node is stored in a table (such as 202) in the memory space.

Preferably, the nodes are arranged by node level in the table so that nodes at the highest node level are grouped together at a lowest set of available indices of the table. The node level for each node is preferably determined in relation to a number of leading zeroes in the associated index. The total available number of nodes of the skip list is further preferably selected to be less than half of the largest power of 2 that can be expressed by a number of bits of the index (e.g., using $2^{14}$ nodes with a 16 bit index; using $2^{30}$ nodes with a 32 bit index, etc.).

Preferably, nodes at relatively lower node levels comprise an m-bit format (such as 8 bytes as in Table 2), nodes at relatively higher node levels comprise an n-bit format (such as 16 bytes as in Table 3), and m is less than n.

The available indices of the table preferably comprise sequentially even and odd indices, and the nodes are stored at only a selected one of said even indices or odd indices (such as in Table 4). In such case, a free list of nodes (such as by 200) is preferably generated from the table generated from an array of pairs of counts and indices (such as by 206).

Further, the table can be preferably characterized as a first primary table, and the data structure is further preferably provided with a second primary table (such as 240) to store additional nodes when a distribution of nodes at relatively higher node levels in the first primary table is reduced. A secondary table (such as 242) can also be provided to store a second type of information associated with the first type of information stored by the primary nodes. The structure further preferably comprises up and down queues (such as 250, 252) to facilitate an elevator search of the nodes.

In further implementations, the method preferably comprises steps of generating a skip list (such as 200) of nodes (such as 206) having an array of forward pointers (such as 210), each node in the skip list comprising a node level in relation to a number of forward pointers from the array associated with said node, and indexing the nodes (such as by Table 1) in a table (such as 202) in a memory space (such as 114, 116, 124) by node level so that nodes at the highest node level are grouped together at a lowest set of available indices of the table.

Preferably, the indexing step comprises deriving the node level for each node in relation to a number of leading zeroes in an index value associated with the address of said node in the table. The index value preferably comprises a power of two (e.g., such as 16 bits, 32 bits, etc.).

As before, the total number of nodes of the skip list of the generating step is preferably selected to be less than half of the largest power of 2 that can be expressed by a number of bits of an index field used to address the table of the indexing step (such as by using $2^{14}$ nodes with a 16 bit index; using $2^{30}$ nodes with a 32 bit index, etc.).

The generating step further preferably comprises providing nodes at relatively lower node levels with an m-bit format (e.g., Table 2) and providing nodes at relatively higher node levels with an n-bit format (e.g., Table 3), wherein m is less than n. The available indices of the table preferably comprise sequentially even and odd indices, and wherein the nodes are preferably stored during the indexing step at only a selected one of said even indices or odd indices using a free node generation routine (such as at 200).

For purposes of the appended claims, the recited first means for efficiently arranging and searching data in said memory space will be understood to correspond to the structure set forth in FIGS. 3-6. Skip lists formatted in accordance with the prior art, and other data arranging and searching architectures, such as tree searches and flat maps, are excluded from the first means and do not constitute an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A data structure resident in a memory space comprising a skip list of nodes enabling a user manipulation of data via a controller, the nodes having an array of forward pointers, wherein each node in the skip list has a node level in relation to a number of forward pointers from the array associated with said node, and wherein each node level is derived from an index at which the node is stored in a table in the memory space.

2. The data structure of claim 1, wherein the nodes are arranged by node level in the table so that nodes at a highest node level are grouped together at a lowest set of available indices of the table.

3. The data structure of claim 1, wherein the node level for each node is determined in relation to a number of leading zeroes in the associated index.

4. The data structure of claim 1, wherein the total available number of nodes of the skip list is selected to be less than half of the largest power of 2 that is expressed by a number of bits of the index.

5. The data structure of claim 1, wherein nodes at relatively lower node levels comprise an m-bit format, nodes at relatively higher node levels comprise an n-bit format, and m is less than n.

6. The data structure of claim 1, wherein the available indices of the table comprise sequentially even and odd indices, and wherein the nodes are stored at only a selected one of said even indices or odd indices.

7. The data structure of claim 6, further comprising a free list of nodes from the table generated from an array of pairs of counts and indices.

8. The data structure of claim 1, wherein the table is characterized as a first primary table, and wherein the data structure further comprises a second primary table to store additional nodes when a distribution of nodes at relatively higher node levels in the first primary table is reduced.

9. The data structure of claim 1, wherein the nodes of the skip list are characterized as comprising a first type of information, and wherein the data structure further comprises a secondary table to provide a second type of information associated with the first type of information.

10. The data structure of claim 1 further comprising respective up and down queues to facilitate a search operation upon the nodes.

11. A method comprising steps of generating a skip list of nodes having an array of forward pointers, each node in the skip list comprising a node level in relation to a number of forward pointers from the array associated with said node, indexing the nodes in a table in a memory space by node level so that nodes at a highest node level are grouped together at a lowest set of available indices of the table, and using the skip list to manipulate data via a controller.

12. The method of claim 11, wherein the indexing step comprises deriving the node level for each node in relation to a number of leading zeroes in an index value associated with an address of said node in the table.

13. The method of claim 12, wherein the index value of the indexing step is a power of two.

14. The method of claim 11, wherein the total number of nodes of the skip list of the generating step is selected to be less than half of the largest power of 2 that is expressed by a number of bits of an index field used to address the table of the indexing step.

15. The method of claim 11, wherein the generating step comprises providing nodes at relatively lower node levels with an m-bit format and providing nodes at relatively higher node levels with an n-bit format, wherein m is less than n.

16. The method of claim 11, wherein the available indices of the table comprise sequentially even and odd indices, and wherein the nodes are stored during the indexing step at only a selected one of said even indices or odd indices.

17. The method of claim 16, wherein the indexing step further comprises generating a free list of nodes from an array of pairs of counts and indices.

18. An apparatus comprising a controller, a memory space and first means for efficiently arranging and searching data in said memory space using said controller comprising a skip list of nodes in said memory space enabling a user manipulation of data via the controller, the nodes having an array of forward pointers, wherein each node in the skip list has a node level in relation to a number of forward pointers from the array associated with said node, and wherein each node level is derived from an index at which the node is stored in a table in the memory space.

19. The apparatus of claim 18, wherein the controller comprises a data storage array controller, and the memory space comprises a cache memory of said controller.

* * * * *